(12) United States Patent
Huang

(10) Patent No.: US 11,433,551 B2
(45) Date of Patent: Sep. 6, 2022

(54) MEASUREMENT SYSTEM AND METHOD FOR POSITIONING ACCURACY OF A ROBOTIC ARM

(71) Applicant: INSTITUTE FOR INFORMATION INDUSTRY, Taipei (TW)

(72) Inventor: Yung-I Huang, Taipei (TW)

(73) Assignee: INSTITUTE FOR INFORMATION INDUSTRY, Taipei (TW)

( * ) Notice: Subject to any disclaimer, the term of this patent is extended or adjusted under 35 U.S.C. 154(b) by 0 days.

(21) Appl. No.: 16/784,262

(22) Filed: Feb. 7, 2020

(65) Prior Publication Data

US 2021/0146551 A1 May 20, 2021

(30) Foreign Application Priority Data

Nov. 19, 2019 (TW) .................................. 108141927

(51) Int. Cl.
| | |
|---|---|
| *B25J 13/08* | (2006.01) |
| *B25J 9/16* | (2006.01) |
| *G01D 5/14* | (2006.01) |
| *G01B 7/004* | (2006.01) |

(52) U.S. Cl.
CPC ........... *B25J 13/087* (2013.01); *B25J 9/1694* (2013.01); *B25J 13/088* (2013.01); *G01B 7/004* (2013.01); *G01D 5/145* (2013.01)

(58) Field of Classification Search
CPC ...... B25J 13/087; B25J 9/1694; B25J 13/088; B25J 13/089; B25J 19/0095; G01B 7/004; G01D 5/145

USPC .................................................. 700/245–264
See application file for complete search history.

(56) References Cited

U.S. PATENT DOCUMENTS

| | | | | |
|---|---|---|---|---|
| 4,459,858 | A | * 7/1984 | Marsh ....................... | G01F 1/58 73/861.15 |
| 5,395,033 | A | * 3/1995 | Byrne .............. | A61B 17/07207 227/19 |
| 5,938,603 | A | * 8/1999 | Ponzi ................ | A61M 25/0147 604/523 |
| 6,466,011 | B1 | 10/2002 | Imanaka et al. | |

(Continued)

FOREIGN PATENT DOCUMENTS

| | | |
|---|---|---|
| CN | 102744724 A | 10/2012 |
| CN | 104918755 A | 9/2015 |

(Continued)

*Primary Examiner* — Jaime Figueroa

(57) ABSTRACT

A measurement system for positioning accuracy of a robotic arm includes the robotic arm, a computing device, a robotic arm controlling device, a first magnetic element and a second magnetic element. The robotic arm controlling device is electrically connected to the robotic arm and the computing device. The first magnetic element is disposed on a robotic arm. The second magnetic element is disposed on a fixed platform. One of the first magnetic element and the second magnetic element is electrically connected to the computing device. The robotic arm controlling device controls the robotic arm to move the first magnetic element above the second magnetic element to generate a magnetic field. The computing device is configured to calculate a plurality of movement error information of the first magnetic element in the magnetic field, and count the plurality of movement error information to obtain a positioning accuracy of the robot arm.

7 Claims, 5 Drawing Sheets

(56) References Cited

U.S. PATENT DOCUMENTS

| | | | | |
|---|---|---|---|---|
| 6,611,142 | B1* | 8/2003 | Jones | G01R 33/10 |
| | | | | 324/261 |
| 7,397,539 | B2* | 7/2008 | Willems Van Dijk | |
| | | | | G03F 7/7075 |
| | | | | 355/75 |
| 8,148,978 | B2* | 4/2012 | Sherman | G01R 33/0206 |
| | | | | 324/207.13 |
| 9,671,257 | B2* | 6/2017 | Held | G01B 7/004 |
| 9,857,245 | B2* | 1/2018 | Onal | G01L 1/122 |
| 9,966,816 | B2* | 5/2018 | Kokubo | B25J 13/088 |
| 10,505,428 | B2* | 12/2019 | Kokubo | G01D 5/2451 |
| 2004/0227924 | A1* | 11/2004 | Willems Van Dijk | |
| | | | | G03F 7/70741 |
| | | | | 355/72 |
| 2005/0096794 | A1* | 5/2005 | Yim | H01L 21/67766 |
| | | | | 700/258 |
| 2006/0162175 | A1* | 7/2006 | Stamenkovic | G01S 5/14 |
| | | | | 33/503 |
| 2008/0200807 | A1* | 8/2008 | Wright | A61B 8/10 |
| | | | | 600/443 |
| 2009/0154293 | A1* | 6/2009 | Sengupta | F01D 21/003 |
| | | | | 367/118 |
| 2012/0108988 | A1* | 5/2012 | Ludwin | A61B 18/1492 |
| | | | | 600/587 |
| 2014/0167745 | A1* | 6/2014 | Held | G01B 7/004 |
| | | | | 73/1.79 |
| 2014/0195052 | A1* | 7/2014 | Tsusaka | B25J 3/04 |
| | | | | 700/260 |
| 2015/0164596 | A1* | 6/2015 | Romo | A61B 34/37 |
| | | | | 604/95.04 |
| 2016/0265985 | A1* | 9/2016 | Onal | G01L 5/226 |
| 2016/0365771 | A1* | 12/2016 | Kokubo | B25J 9/1641 |
| 2017/0080569 | A1* | 3/2017 | Kell | B25J 9/1694 |
| 2018/0146976 | A1* | 5/2018 | Clauda | A61B 18/1445 |
| 2018/0241283 | A1* | 8/2018 | Kokubo | G01D 5/145 |
| 2019/0001501 | A1* | 1/2019 | Roberts | B25J 13/088 |
| 2021/0001488 | A1* | 1/2021 | Birkmeyer | B25J 9/1679 |
| 2021/0268615 | A1* | 9/2021 | Morton | B25J 15/0608 |
| 2021/0290314 | A1* | 9/2021 | Sachs | A61B 34/30 |

FOREIGN PATENT DOCUMENTS

| | | |
|---|---|---|
| JP | H09318306 A | 12/1997 |
| JP | 2002091522 A | 3/2002 |
| JP | 2004213620 A | 7/2004 |
| JP | 2010142901 A | 7/2010 |
| JP | 2015178956 A | 10/2015 |
| WO | 2018213980 A1 | 11/2018 |

\* cited by examiner

MEASUREMENT SYSTEM AND METHOD FOR POSITIONING ACCURACY OF A ROBOTIC ARM

FIELD OF THE INVENTION

The present invention relates to a measurement technology of positioning accuracy, and more particularly to a measurement system and method for positioning accuracy of a robotic arm.

BACKGROUND OF THE INVENTION

Robotic arms have been used in many fields, such as part assembly or semiconductor wafer clamping. However, the terminal of the robotic arm must have a certain degree of accuracy to avoid damage to the product or reduction of the yield of the product due to excessive error during the processing.

There are several positioning correction techniques for robotic arm terminals, such as laser interferometers, laser trackers, image sensors, and laser cross positioning technology. The laser interferometer can only measure the positioning accuracy of one axis in the three-degree space at a time, and has the problem of time-consuming operation. The laser tracker has a fast and accurate measurement of high portability and positioning accuracy, but has a problem of excessive hardware cost. The image sensor has two kinds of cameras: a single camera and a three-dimensional camera. The single camera can only capture information of two axes in a three-dimensional space, and the software and hardware required for the three-dimensional camera are very expensive. Laser cross positioning technology has high accuracy, but it has the problem of measuring time too long and the cost of software and hardware too high.

On the other hand, if the robotic arm can accurately measure the positioning accuracy during use, the robot arm can be corrected immediately without stopping. Among the above positioning correction technologies, only the image sensor can detect the positioning accuracy during the use of the robotic arm, but the image sensor generates oil stain of the lubricating oil during use.

SUMMARY OF THE INVENTION

Embodiments of the present invention provide a measurement system and method for positioning accuracy of a robotic arm, which can accurately and quickly measure the positioning accuracy of the robotic arm in a three-dimensional space, and can be used in the operation of the robotic arm without generating pollution.

The measurement system for positioning accuracy of a robotic arm provided by the present invention includes the robotic arm, a computing device, a robotic arm controlling device, a first magnetic element and a second magnetic element. The robotic arm controlling device is electrically connected to the robotic arm and the computing device. The first magnetic element is disposed on a robotic arm. The second magnetic element is disposed on a fixed platform. One of the first magnetic element and the second magnetic element is electrically connected to the computing device. The robotic arm controlling device is configured to control the robotic arm to move the first magnetic element above the second magnetic element to generate a magnetic field, so that the first magnetic element moves above the second magnetic element. The computing device is configured to calculate a plurality of movement error information of the first magnetic element in the magnetic field, and count the plurality of movement error information to obtain a positioning accuracy of the robot arm.

The measurement method for positioning accuracy of a robotic arm provided by the present invention includes steps of: a) providing a first magnetic element, wherein the first magnetic element is disposed on the robotic arm; b) providing a second magnetic element, wherein the second magnetic element is disposed on a fixed platform; c) providing a computing device and a robotic arm controlling device, wherein the computing device is electrically connected to one of the first magnetic element and the second magnetic element, and the robotic arm controlling device being electrically connected to the robotic arm and the computing device; d) controlling the robotic arm by the robotic arm controlling device to move the first magnetic element above the second magnetic element to generate a magnetic field; e) controlling the robotic arm by the robotic arm controlling device, so that the first magnetic element moves above the second magnetic element; f) calculating, by the computing device, a plurality of movement error information of the first magnetic element according to a movement of the first magnetic element, and counting the plurality of movement error information to obtain a positioning accuracy of the robotic arm.

In an embodiment of the present invention, the robotic arm comprises an operation end on which an end-effector is disposed, and the first magnetic element is fixed on the end-effector.

In an embodiment of the present invention, the first magnetic element is a magnetic probe, and the second magnetic element is an array Hall sensor and electrically connected to the computing device.

In an embodiment of the present invention, the second magnetic element is a magnetic probe, and the first magnetic element is an array Hall sensor and electrically connected to the computing device.

In an embodiment of the present invention, the robotic arm includes a plurality of shaft bodies rotatably connected to one another, and the first magnetic element is disposed on a shaft body at an extreme end of the plurality of shaft bodies.

In an embodiment of the present invention, the measurement system for positioning accuracy of a robotic arm further includes a display interface applied to display a position of the first magnetic element or the second magnetic element in the magnetic field.

In an embodiment of the present invention, the step of calculating the plurality of movement error information of the first magnetic element includes: moving the first magnetic element to an initial point above the second magnetic element; and repetitively moving the first magnetic element away from the initial point and then back to the initial point.

The measurement system and method for positioning accuracy of a robotic arm of the embodiment of the present invention configure the first magnetic element and the second magnetic element between the robotic arm and the fixed platform. The magnetic field generated by the first magnetic element and the second magnetic element can quickly and accurately measure the three-axis movement information of the operation end of the robotic arm in the three-dimensional space, thereby providing compensation information. In addition, the measurement system and method for positioning accuracy of a robotic arm of the embodiment of the present invention can be used during the operation of the robotic arm without causing pollution such as oil stains.

In order to make the above and other objects, features, and advantages of the present invention more comprehensible, embodiments are described below in detail with reference to the accompanying drawings, as follows.

DETAILED DESCRIPTION OF PREFERRED EMBODIMENTS

Figure 1A:
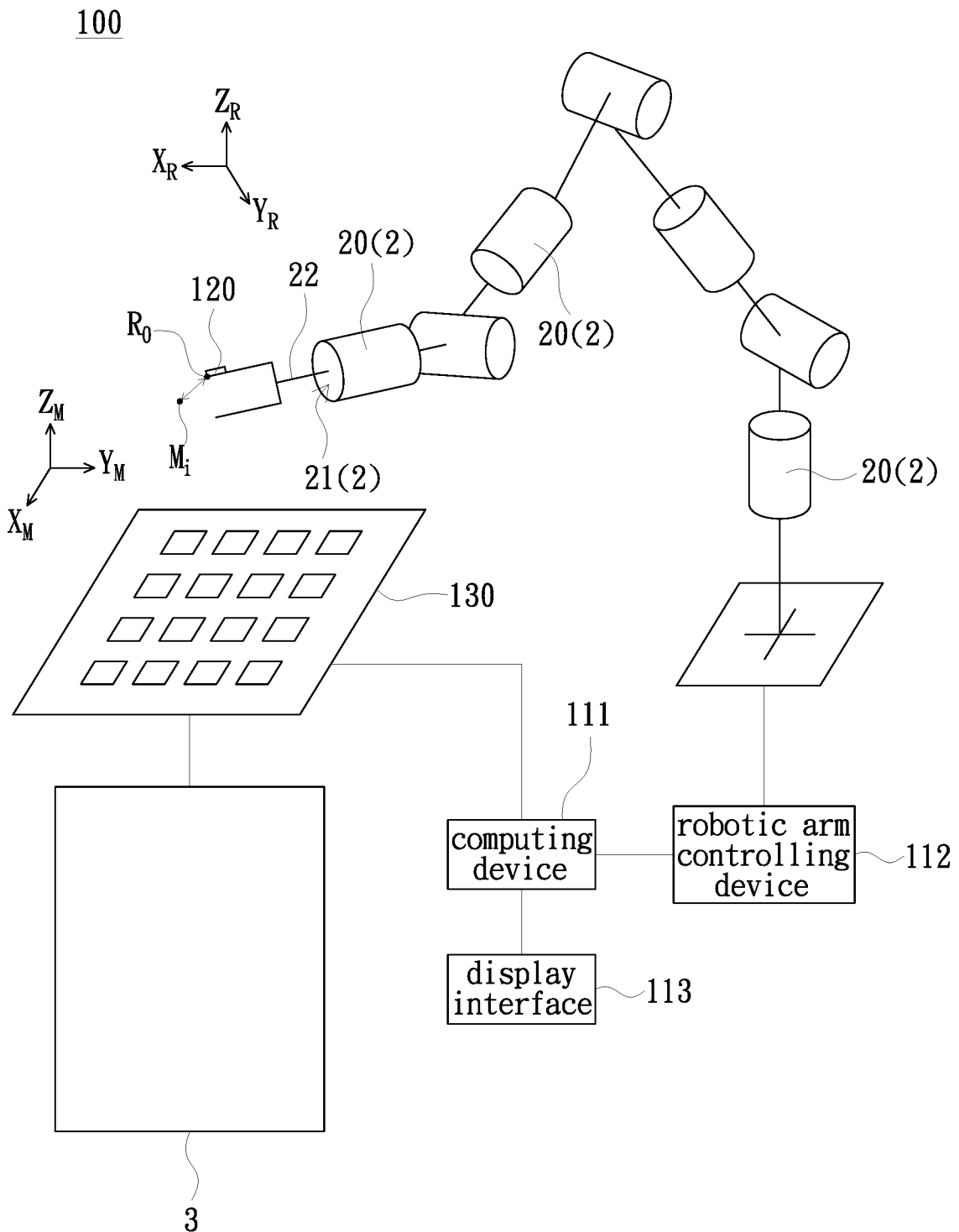
FIG. 1A is a schematic diagram of a measurement system for positioning accuracy of a robotic arm provided by an embodiment of the present invention.
Figure 1B:
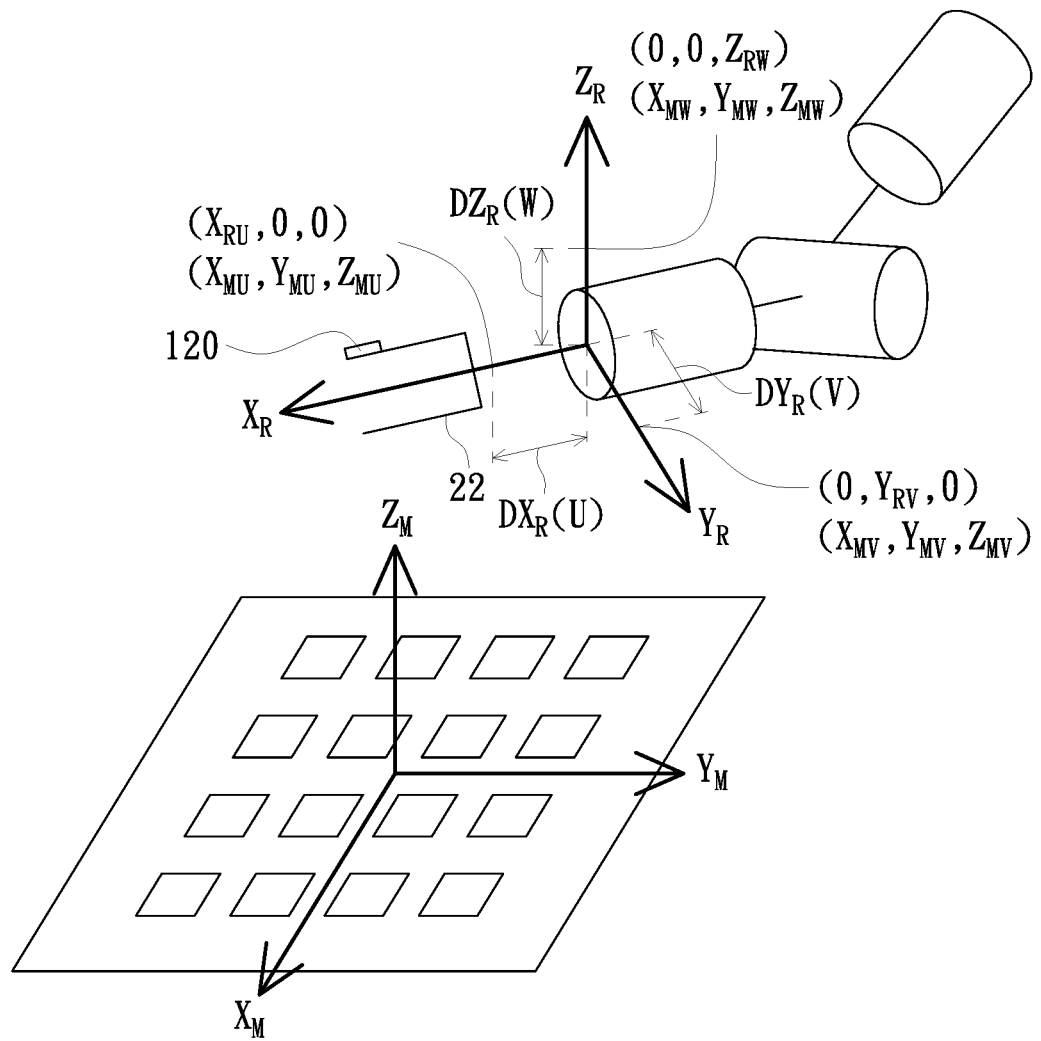
FIG. 1B is a schematic diagram of a transformation matrix for obtaining a coordinate system between a robotic arm and a fixed platform provided by an embodiment of the present invention.

FIG. 1A is a schematic diagram of a measurement system for positioning accuracy of a robotic arm provided by an embodiment of the present invention. FIG. 1B is a schematic diagram of a transformation matrix for obtaining a coordinate system between a robotic arm and a fixed platform provided by an embodiment of the present invention. Please refer to FIG. 1A and FIG. 1B, a measurement system 100 for positioning accuracy of a robotic arm in the embodiment includes a robotic arm 2, a computing device 111, a robotic arm controlling device 112, a first magnetic element 120, and a second magnetic element 130 to measure the positioning accuracy of an operation end 21 of the robotic arm 2.

The robotic arm controlling device 112 is electrically connected to the robotic arm 2 and the computing device 111. The first magnetic element 120 is disposed on the robotic arm 2. The second magnetic element 130 is disposed on a fixed platform 3. One of the first magnetic element 120 and the second magnetic element 130 can be electrically connected to the computing device 111. In the embodiment, the robotic arm 2 is disposed an end-effector 22 on an operation end 21 thereof, and the first magnetic element 120 is a magnetic probe and disposed on the end-effector 22. On the other hand, the robotic arm 2 can include a plurality of shaft bodies 20 rotatably connected to one another, and the end-effector 22 is disposed on a shaft body at an extreme end of the plurality of shaft bodies 20. The second magnetic element 130 disposed on the fixed platform 3 is an array Hall sensor and electrically connected to the computing device 111. In the embodiment, the end-effector 22 shown in FIG. 1A is a gripper jaw, but is not limited thereto.

In the embodiment, the computing device 111 is electrically connected to the second magnetic element 130 to receive a signal of a magnetic field generated by the first magnetic element 120 and the second magnetic element 130 and obtain a position of the first magnetic element 120 in the magnetic field through a program having an algorithm. The robotic arm controlling device 112 is electrically connected to the robotic arm 2 and the computing device 111 to receive instructions of the computing device 111 for controlling the movement of the robotic arm 2. The measurement system 100 for positioning accuracy of a robotic arm of the embodiment can further include a display interface 113. The display interface 113 is electrically connected to the computing device 111 to display the position of the first magnetic element 120 in the magnetic field. The computing device 111 can be a computer or a microcomputer, the robotic arm controlling device 112 can drive and control the robotic arm 2 and usually include an electric control box (not shown) and a guiding device (not shown) electrically connected to the electric control box, and the display interface 113 can be a screen, but are not limited thereto.

The robotic arm controlling device 112 is configured to control the robotic arm 2 to move the first magnetic element 120 above the second magnetic element 130 to generate the magnetic field, so that the first magnetic element 120 moves above the second magnetic element 130. The computing device 111 is configured to calculate a plurality of movement error information of the first magnetic element 120 in the magnetic field and count the plurality of movement error information to obtain a positioning accuracy of the robotic arm 2. In the embodiment, a coordinate system of the end-effector 22 of the first magnetic element 120 includes three axes of $X_R$, $Y_R$, and $Z_R$, and a coordinate system of the fixed platform 3 includes three axes of $X_M$, $Y_M$, and $Z_M$. The robotic arm controlling device 112 can control the robotic arm 2 to reciprocate in the range of the magnetic field. For example, in FIG. 1A, the robotic arm controlling device 112 first controls the robotic arm 2 to move the first magnetic element 120 (the magnetic probe) to an initial position R0 of the coordinate system of the end-effector 22 above a center of the second magnetic element 130 (the array Hall sensor), and then the robotic arm controlling device 112 continuously controls the robotic arm 2 to repeatedly move the first magnetic element 120 away from and then back to the initial position R0. However, due to the movement error of the robotic arm 2, the first magnetic element 120 may not accurately return to the initial position R0 and move to a position near the initial position R0. Assuming that it has been moved n times and each time it moves to the position Mi of the coordinate system relative to the fixed platform 3 (where i=1 to n) and a single-time movement error information is AMi-R0, where A is a transformation matrix used to transfer the coordinate system of the end-effector 22 to the coordinate system of the fixed platform 3. Thus, the positioning accuracy of the operation end 21 of the robotic arm 2 can be obtained by calculating the plurality of movement error information of the first magnetic element 120 in the magnetic field by the computing device 111.

As shown in FIG. 1B, the obtain of the transformation matrix A may be realized by that the robotic arm controlling device 112 controls the robotic arm 2 so that the first magnetic element 120 moves a distance of $D_{XR}$ ($X_{RU}$, 0, 0) along the $X_R$ axis, moves a distance of $D_{YR}$ (0, $Y_{RV}$, 0) along the $Y_R$ axis and moves a distance of $D_{ZR}$ (0, 0, $Z_{RW}$) along the $Z_R$ axis. For the coordinate system of the fixed platform 3, the first magnetic element 120 moves a distance of U ($X_{MU}$, $Y_{MU}$, $Z_{MU}$) along the $X_M$ axis, moves a distance of V ($X_{MV}$, $Y_{MV}$, $Z_{MV}$) along the $Y_M$ axis, and moves a distance of W ($X_{MW}$, $Y_{MW}$, $Z_{MW}$) along the $Z_M$ axis. Based on the distances $D_{XR}$, $D_{YR}$, and $D_{ZR}$ are known and the distances U, V, and W can be measured, the transformation matrix A of the end-effector 22 relative to the fixed platform 3 can be obtained.

The measurement system 100 for positioning accuracy of the robotic arm of the embodiment can detect the positioning accuracy by the above detection method before the end-effector 22 of the robotic arm 2 performs a task. When it is found that the positioning accuracy of the robotic arm 2 is insufficient, the user can compensate the movement of the robotic arm 2 by the robotic arm controlling device 112. Further, when it is found that the positioning accuracy is too low to correct the movement of the robotic arm 2 by compensation, maintenance or replacement of the robot arm 2 can be considered.

The measurement system 100 for positioning accuracy of the robotic arm of the embodiment is provided with the first magnetic element 120 and the second magnetic element 130 between the robotic arm 2 and the fixed platform 3, and the magnetic field generated by the first magnetic element 120 and the second magnetic element 130 can quickly and accurately measure the movement error information of the operation end 21 of the robotic arm 2 in the three-dimensional space, thereby providing compensation information. In addition, the measurement system and method for positioning accuracy of the robotic arm provided by the embodiments of the present invention can be used during the operation of the robotic arm 2 without causing pollution such as oil pollution.

Figure 2:
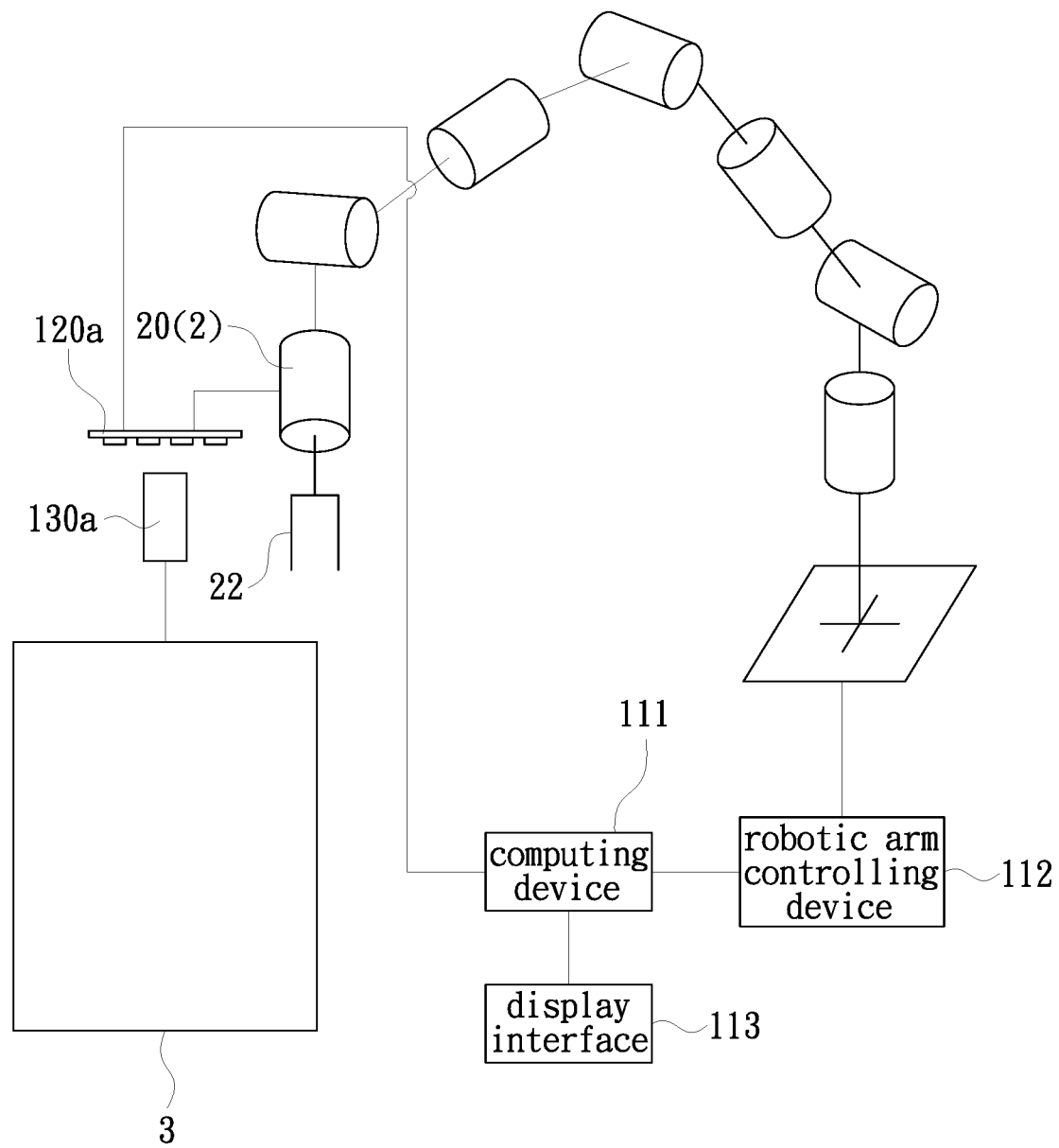
FIG. 2 is a schematic diagram of a measurement system for positioning accuracy of a robotic arm provided by another embodiment of the present invention.

FIG. 2 is a schematic diagram of a measurement system for positioning accuracy of a robotic arm provided by another embodiment of the present invention. Please refer to FIG. 2, the measurement system 100a of the positioning accuracy of the embodiment is substantially the same as the embodiment of FIG. 1A, except that the first magnetic element 120a of the embodiment is an array Hall sensor disposed on the robotic arm 2 and electrically connected to the computing device 111, and the second magnetic element 130a is a magnetic probe disposed on the fixed platform 3. In addition, in the embodiment, the first magnetic element 120a being as an array Hall sensor is disposed on the shaft body 20, which is different from that the first magnetic element 120 being as a magnetic probe is coupled to the end-effector 22 in the embodiment of FIG. 1A. In the embodiment, the computing device 111 is electrically connected to the first magnetic element 120a and is configured to receive the signal of the magnetic field generated by the first magnetic element 120a and the second magnetic element 130a, and obtain a position of the second magnetic element 130a in the magnetic field through a program having an algorithm. The employed algorithm may include various mathematical formulas related variables for a specific solution, such as homogeneous transformation matrices or regression algorithms, or may include data training model methods such as neural network, back propagation, ANN, CNN, or RNN, but it is not limited thereto.

Figure 3:
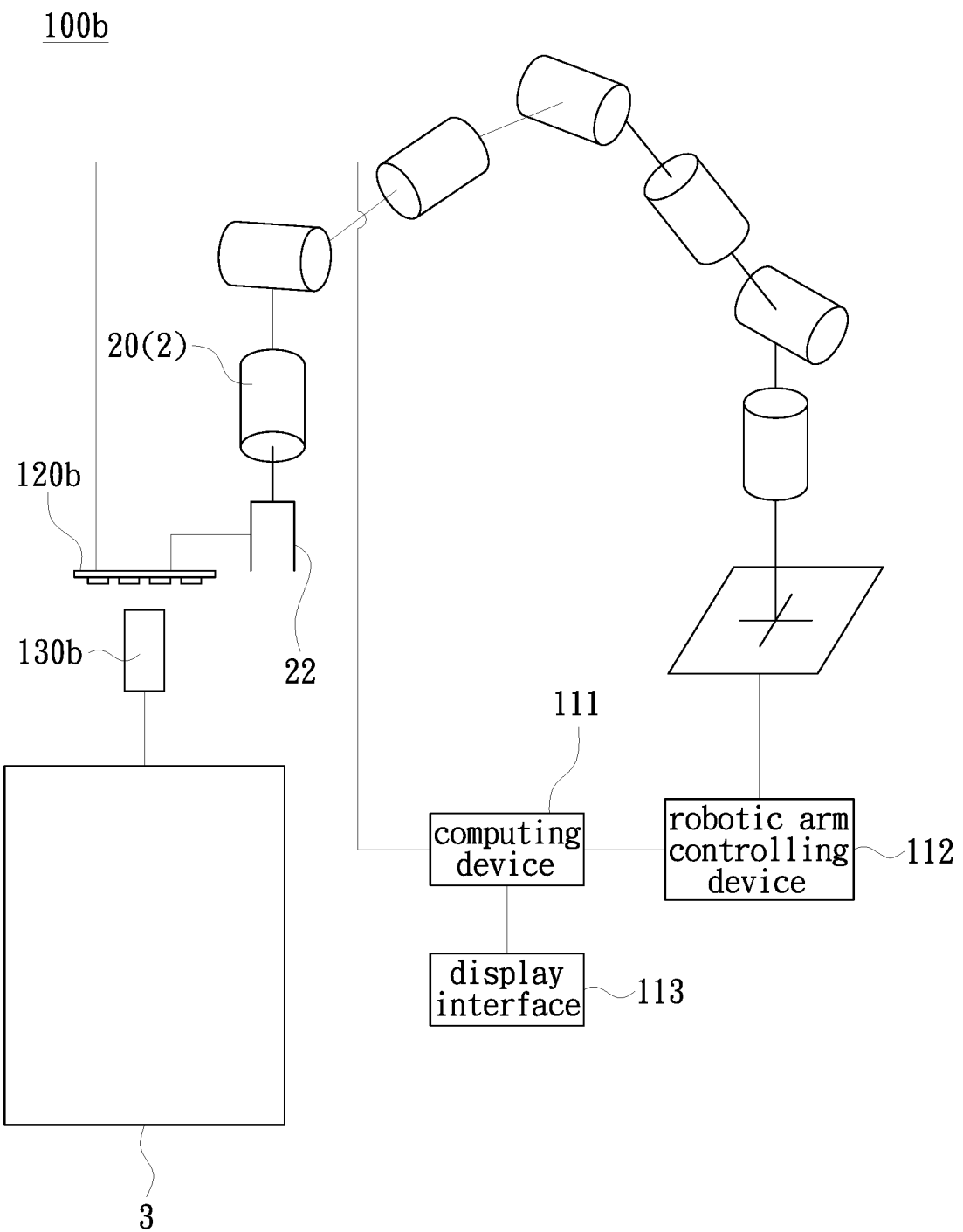
FIG. 3 is a schematic diagram of a measurement system for positioning accuracy of a robotic arm provided by another embodiment of the present invention.

FIG. 3 is a schematic diagram of a measurement system for positioning accuracy of a robotic arm provided by another embodiment of the present invention. Please refer to FIG. 3, the measurement system 100b of the embodiment is substantially the same as the embodiment of FIG. 1A, except that the first magnetic element 120b of the embodiment is an array Hall sensor disposed on the robotic arm 2 and electrically connected to the computing device 111, and the second magnetic element 130a is a magnetic probe disposed on the fixed platform 3. In addition, in the embodiment, the first magnetic element 120b being as an array Hall sensor is coupled to the end-effector 22 as the same as the first magnetic element 120 being as a magnetic probe in the embodiment of FIG. 1A. Preferably, the end-effector 22 of the embodiment is a gripper jaw.

Figure 4:
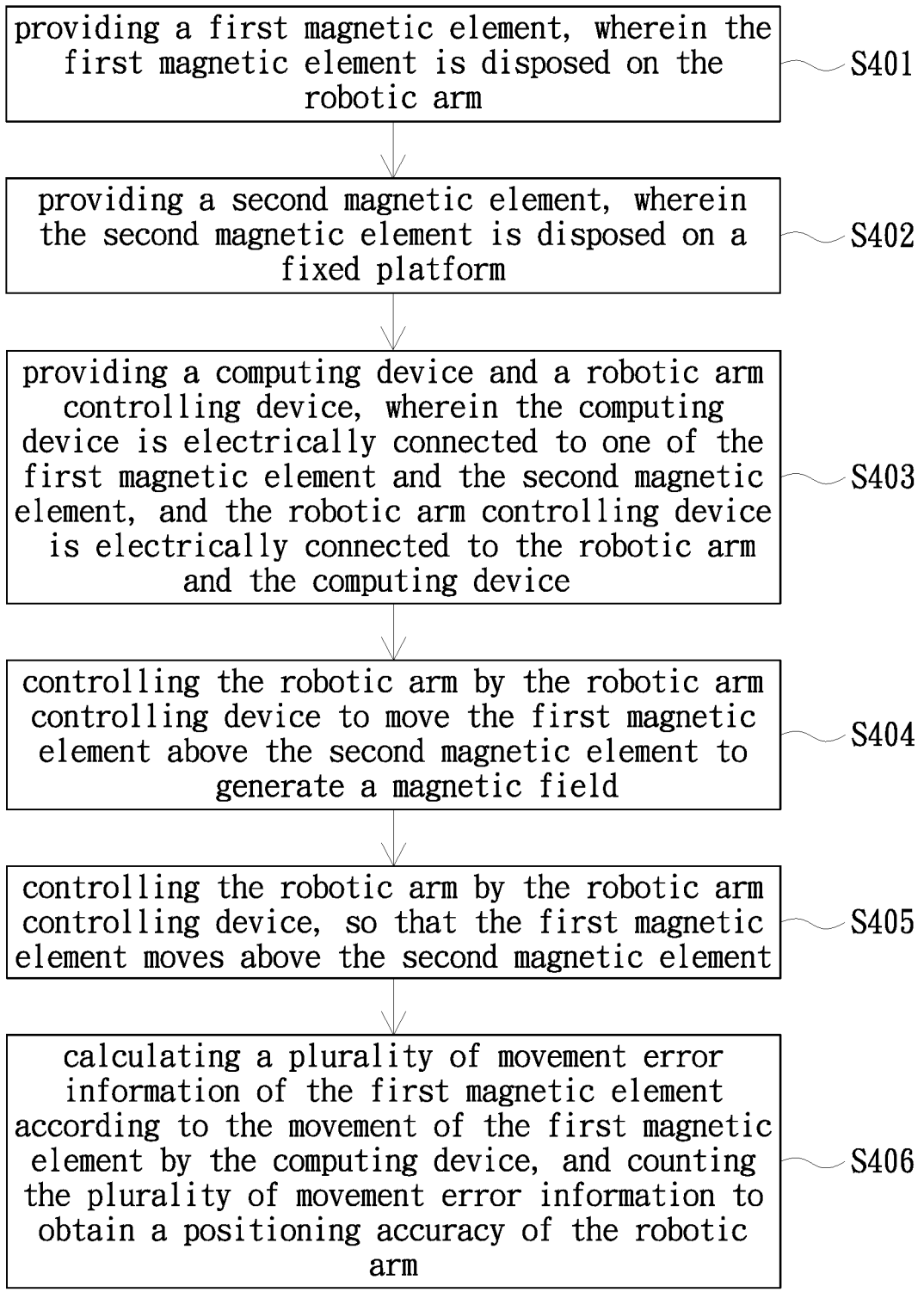
FIG. 4 is a schematic flowchart of a measurement method for positioning accuracy of a robotic arm provided by an embodiment of the present invention.

FIG. 4 is a schematic flowchart of a measurement method for positioning accuracy of a robotic arm provided by an embodiment of the present invention. Please refer to FIG. 4, the measurement method for positioning accuracy of a robotic arm includes steps as follow.

In step S401, a first magnetic element is provided, and the first magnetic element is disposed on the robotic arm. The robotic arm can be the robotic arm 2 in FIG. 1A. The first magnetic element can be the first magnetic element 120 in FIG. 1A, the first magnetic element 120a in FIG. 2, or the first magnetic element 120b in FIG. 3.

In step S402, a second magnetic element is provided, and the second magnetic element is disposed on a fixed platform. The fixed platform can be the fixed platform 3 in FIG. 1A. The second magnetic element can be the second magnetic element 130 in FIG. 1A, the second magnetic element 130a in FIG. 2, or the second magnetic element 130b in FIG. 3.

In step S403, a computing device and a robotic arm controlling device are provided, the computing device is electrically connected to one of the first magnetic element and the second magnetic element, and the robotic arm controlling device is electrically connected to the robotic arm and the computing device. In FIG. 1A, the computing device 111 is electrically connected to the second magnetic element 130. In FIGS. 2 and 3, the computing device 111 is electrically connected to the first magnetic elements 120a and 120b, respectively.

In step S404, the robotic arm is controlled by the robotic arm controlling device to move the first magnetic element above the second magnetic element to generate a magnetic field. In FIG. 1A, the first magnetic element 120 moved by the robotic arm is a magnetic probe. In FIG. 2, the first magnetic element 120a moved by the robotic arm is an array Hall sensor. In FIG. 3, the first magnetic element 120b moved by the robotic arm is an array Hall sensor.

In step S405, the robotic arm is controlled by the robotic arm controlling device, so that the first magnetic element moves above the second magnetic element. For example, in FIG. 1A, the robotic arm controlling device 112 controls the robotic arm 2, so that the first magnetic element 120 is moved to an initial location R0 above the second magnetic element 130, and the first magnetic element 120 is repetitively moved away from and then back to the initial location R0.

In step S406, the computing device calculates a plurality of movement error information of the first magnetic element in the magnetic field according to the movement of the first magnetic element and counts the plurality of movement error information to obtain a positioning accuracy of the robotic arm. For example, in FIG. 1A, the computing device 111 calculates a plurality of movement error information of AMi-R0, counts the plurality of movement error information through the algorithm, and obtains a positioning accuracy of the robotic arm 2.

The measurement system and method for positioning accuracy of the robotic arm of the embodiment is provided with the first magnetic element and the second magnetic element between the robotic arm and the fixed platform, and the magnetic field generated by the first magnetic element and the second magnetic element can quickly and accurately measure the movement error information of the operation end of the robotic arm in the three-dimensional space, thereby providing compensation information. In addition, the measurement system and method for positioning accuracy of the robotic arm according provided by the embodiments of the present invention can be used during the operation of the robotic arm without causing pollution such as oil pollution.

Although the present invention has been disclosed as above with the embodiments, it is not intended to limit the present invention. Those ordinarily skilled in the art may make some modifications and retouching without departing from the spirit and scope of the present invention. Therefore, the protection scope of the present invention shall be determined by the scope of the attached claims.

What is claimed is:

1. A measurement system for positioning accuracy of a robotic arm, comprising:
   the robotic arm;
   a first magnetic element, disposed on the robotic arm;
   a second magnetic element, disposed on a fixed platform;
   a robotic arm controlling device, electrically connected to the robotic arm; and
   a computing device, electrically connected to the robotic arm controlling device and one of the first magnetic element and the second magnetic element;
   wherein the robotic arm controlling device controls the robotic arm to move the first magnetic element above the second magnetic element to generate a magnetic field, so that the first magnetic element moves in the magnetic field of the second magnetic element;
   wherein the computing device calculates a plurality of movement error information of the first magnetic element in the magnetic field, and counts the plurality of movement error information to obtain a positioning accuracy of the robotic arm;
   wherein the first magnetic element is a magnetic probe, and the second magnetic element is an array Hall sensor and electrically connected to the computing device;
   wherein the plurality of movement error information are obtained by calculating differences between distances that the first magnetic element moves and the distances moved by the first magnetic element that the computing device calculates.

2. The measurement system for positioning accuracy of a robotic arm as claimed in claim 1, wherein the robotic arm comprises an operation end on which an end-effector is disposed, and the first magnetic element is fixed on the end-effector.

3. The measurement system for positioning accuracy of a robotic arm as claimed in claim 1, wherein the robotic arm includes a plurality of shaft bodies rotatably connected to one another, and the first magnetic element is disposed on the shaft body at an extreme end of the plurality of shaft bodies.

4. The measurement system for positioning accuracy of a robotic arm as claimed in claim 1, further comprising a display interface connected to the computing device to display a position of the first magnetic element in the magnetic field.

5. A measurement method for positioning accuracy of a robotic arm, comprising steps of:
   providing a first magnetic element, wherein the first magnetic element is disposed on the robotic arm;
   providing a second magnetic element, wherein the second magnetic element is disposed on a fixed platform;
   providing a computing device, wherein the computing device is electrically connected to one of the first magnetic element and the second magnetic element;
   providing a robotic arm controlling device, wherein the robotic arm controlling device is electrically connected to the robotic arm and the computing device;
   controlling the robotic arm by the robotic arm controlling device to move the first magnetic element above the second magnetic element to generate a magnetic field;
   controlling the robotic arm by the robotic arm controlling device, so that the first magnetic element moves in the magnetic field of the second magnetic element;
   calculating, by the computing device, a plurality of movement error information of the first magnetic element in the magnetic field according to a movement of the first magnetic element, and counting the plurality of movement error information to obtain a positioning accuracy of the robotic arm;
   wherein the first magnetic element is a magnetic probe, and the second magnetic element is an array Hall sensor and electrically connected to the computing device;
   wherein the plurality of movement error information are obtained by calculating differences between distances that the first magnetic element moves and the distances moved by the first magnetic element that the computing device calculates.

6. The measurement method for positioning accuracy of a robotic arm as claimed in claim 5, wherein the step of calculating the plurality of movement error information of the first magnetic element comprises steps of:
   moving the first magnetic element to a positioning point above the second magnetic element; and
   repetitively moving the first magnetic element away from and then back to the positioning point.

7. The measurement method for positioning accuracy of a robotic arm as claimed in claim 5, further comprising a step of:
   providing a display interface, wherein the display interface is connected to the computing device to display a position of the first magnetic element in the magnetic field.

* * * * *